M. L. SEVERY.
POWER TRANSMISSION MECHANISM.
APPLICATION FILED DEC. 18, 1912.
1,192,233.
Patented July 25, 1916.
3 SHEETS—SHEET 1.
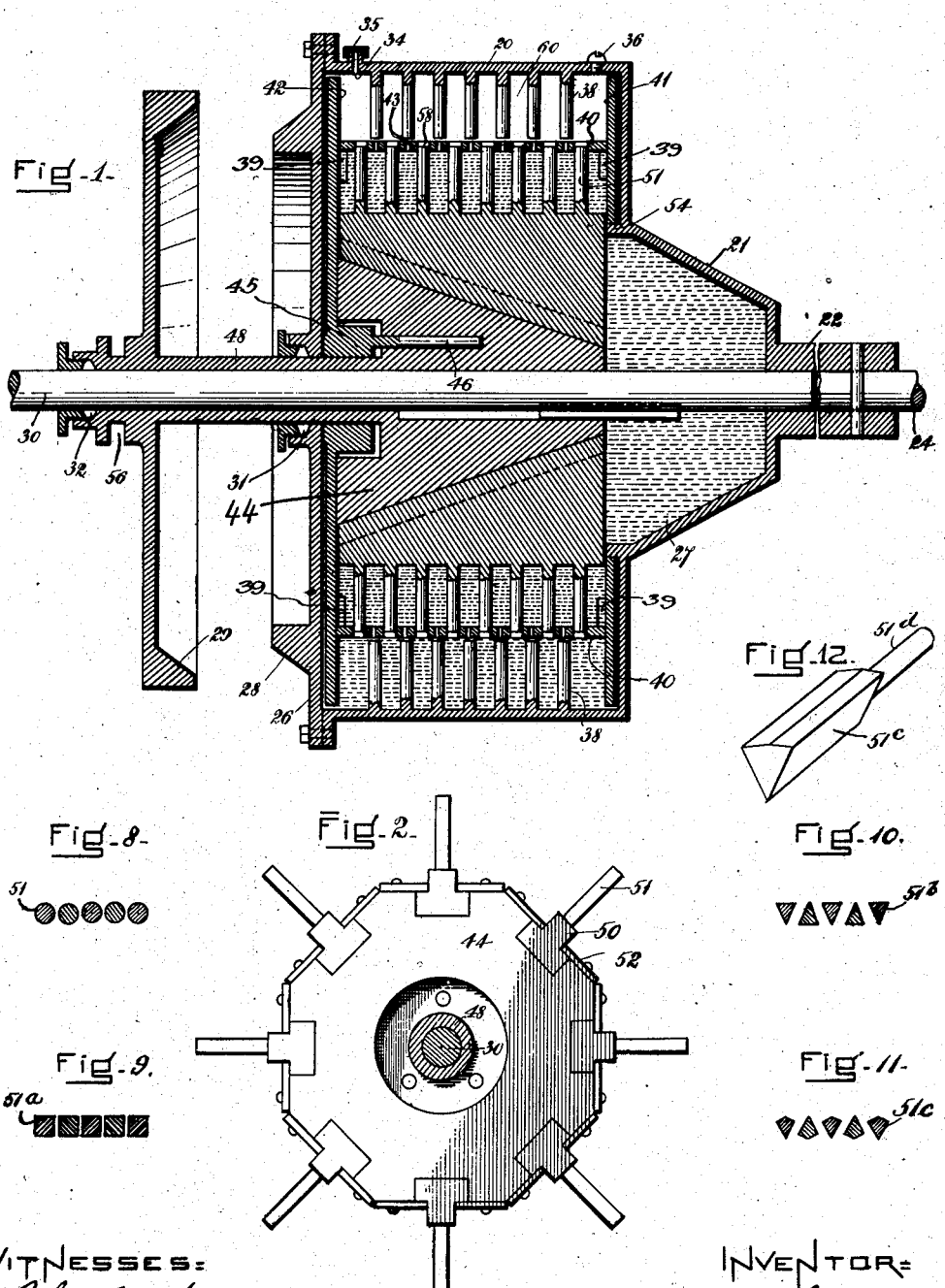
WITNESSES:
John Gordon
L. J. Carr
INVENTOR:
Melvin L. Severy.
by his Attorney
William A. Sperl

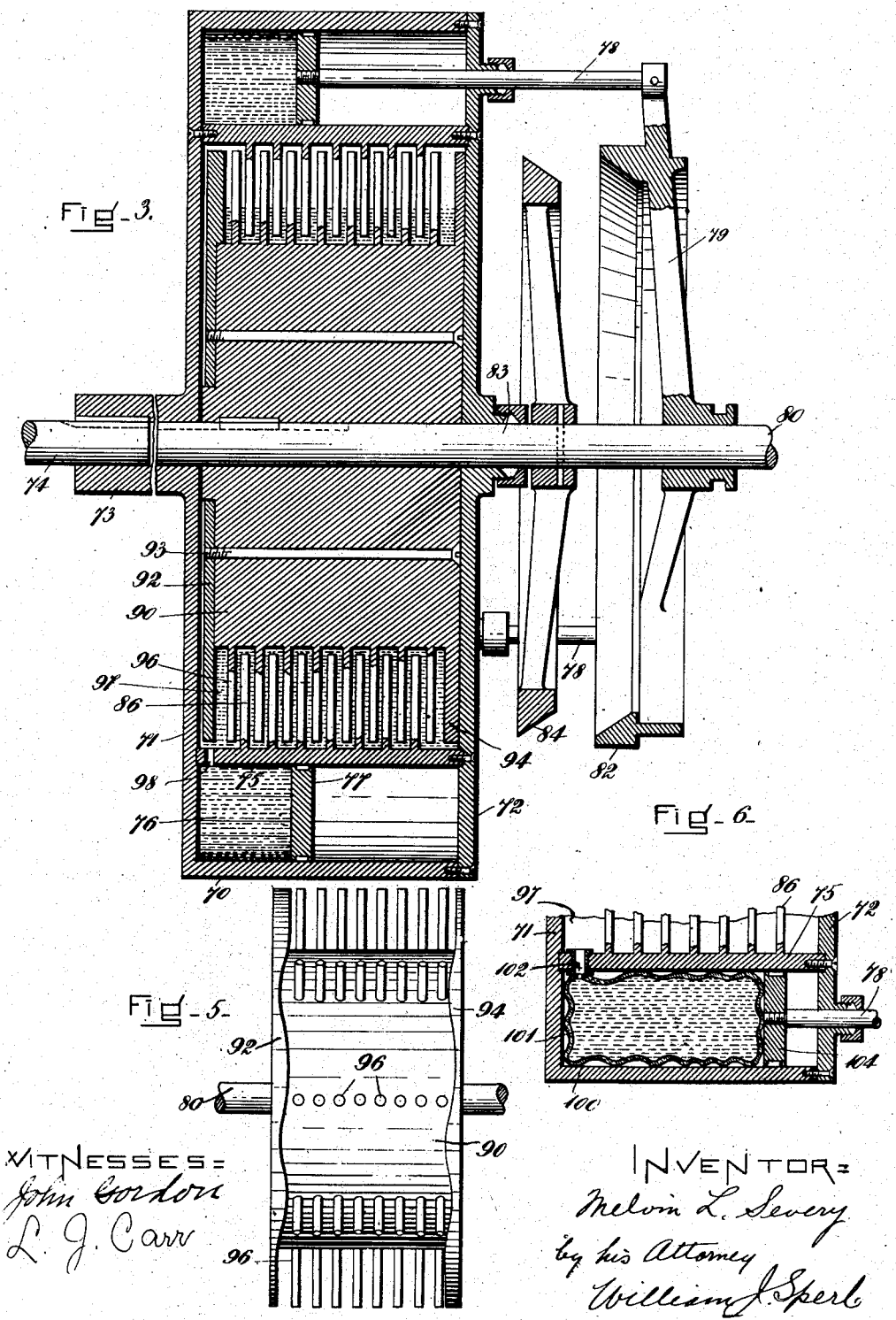

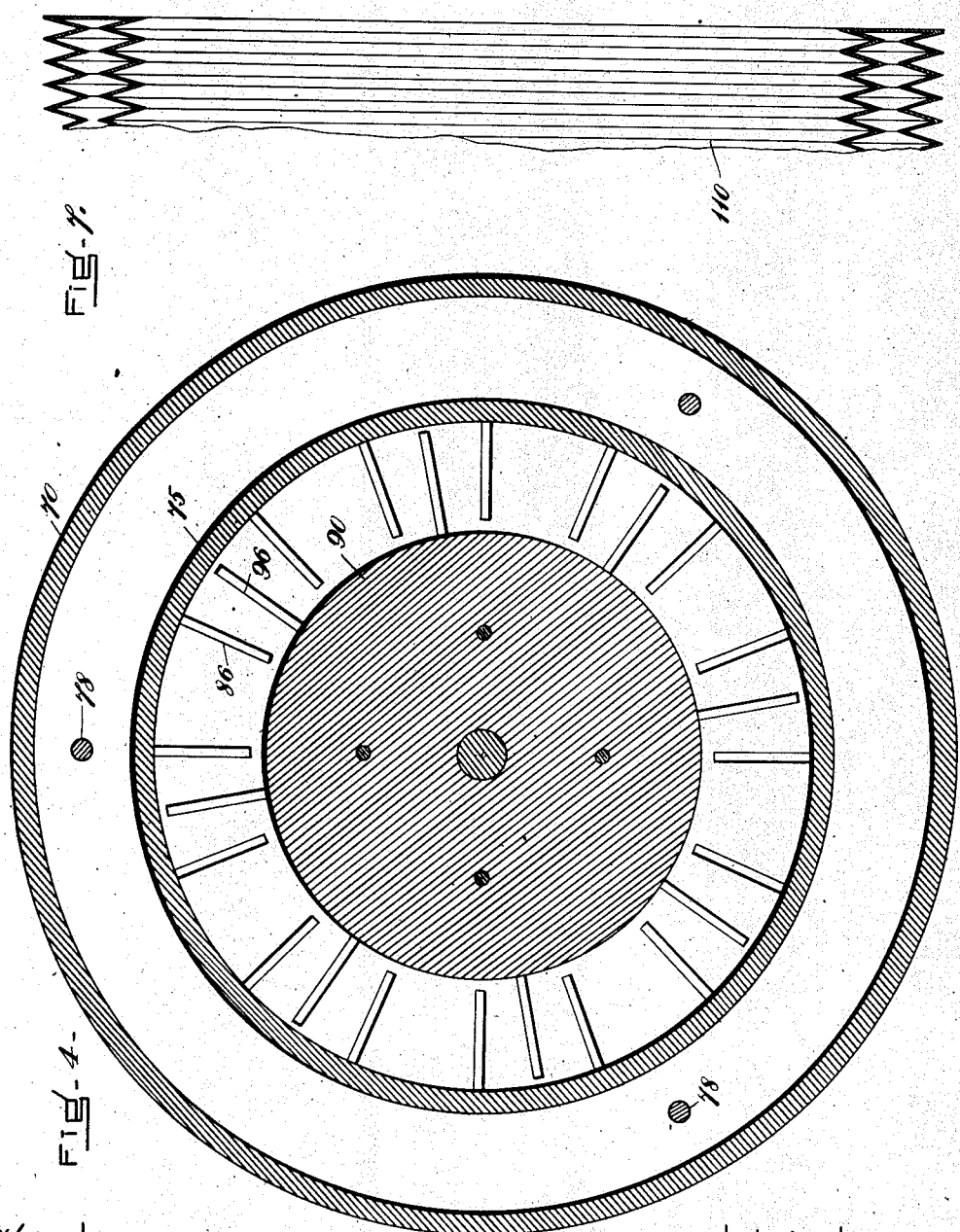

UNITED STATES PATENT OFFICE.

MELVIN L. SEVERY, OF ARLINGTON HEIGHTS, MASSACHUSETTS, ASSIGNOR TO SEVERY MANUFACTURING COMPANY, OF BOSTON, MASSACHUSETTS, A CORPORATION OF MASSACHUSETTS.

POWER-TRANSMISSION MECHANISM.

1,192,233.

Specification of Letters Patent.  Patented July 25, 1916.

Application filed December 18, 1912. Serial No. 737,392.

*To all whom it may concern:*

Be it known that I, MELVIN L. SEVERY, of Arlington Heights, in the county of Middlesex and State of Massachusetts, have invented certain new and useful Improvements in Power-Transmission Mechanism, of which the following is a specification.

This invention relates to power transmission mechanism.

The object of the invention is to provide improved means for transmitting power, comprising a driving member, a driven member, and an interposed medium for transmitting the power from the former to the latter, the relations of the driving or driven member, or of the driving and driven members with respect to said medium being varied to regulate the amount of power transmitted.

In the present embodiment of the invention I preferably employ a fluid or fluids, such as oil, or mercury and oil, although I may employ a finely divided solid, or a mixture of the two. Where a solid is to be used I should prefer that it be divided in spherical form, as balls of steel or the like, and I would generally use a fluid with the balls to cushion their shock upon each other and the confining walls, for the purpose of lubrication and diminution of wear, and to reduce noise. It is obvious that the relation of driving and driven members might be transposed without in the least departing from the spirit of my invention, since were the power applied to the inner member of my device and taken off from the outer member there would be no essential difference in the principle of operation.

As I have preferred to illustrate my invention the driving member comprises a drum which is revolved and provided with fingers or pins so arranged that the contained fluid is forced to rotate with it and seek its outer portion by centrifugal force. This produces a rapidly moving stream of fluid having centrifugal pressure as well as high velocity.

The driven member is provided with fingers or pins which are adapted to be immersed in the circularly moving stream of fluid to a greater or less extent, or to be moved in any other way to vary the area of their acting surfaces, and these fingers are carried along with said fluid; the greater the immersion or the greater the extent of the acting surfaces the greater the amount of power transmitted.

In the accompanying drawings, Figure 1 is a central, longitudinal, vertical section of a preferred embodiment of my invention, Fig. 2 is an end elevation of the pin-carrier for the driven member, Fig. 3 is a central, longitudinal, vertical section of a modified form of the invention, Fig. 4 is a transverse vertical section of the same, Fig. 5 is a side elevation of the inner drum, Fig. 6 is a fragmentary section, showing a modified form of device for varying the amount of fluid which is active upon the fingers or pins, Fig. 7 is a similar view of another modified form, Figs. 8, 9, 10 and 11 are cross-sectional views of various forms of fingers or pins, and Fig. 12 is a perspective view on a larger scale of the preferred form of pin.

In the embodiment illustrated in Figs. 1 and 2, the driving member comprises a drum 20, having at one end a chamber 21 and a boss 22 into which a shaft 24 is pinned. The other end of the drum is closed by a plate 26 bolted thereto and making a tight joint therewith to prevent leakage of the fluid 27 contained within the drum. This fluid may be oil, or where more power is wanted from the same size of device, mercury with a protecting and lubricating liquid of less specific gravity. The plate 26 is provided with a friction cone 28 which is adapted to coöperate with a complementary friction cone 29 keyed to a shaft 30. The plate 26 and member 29 are provided with stuffing boxes 31 and 32, respectively, to prevent leakage of the oil or other liquid while the device is stationary. It will be understood that when the device is running the fluid is thrown against the periphery of the drum and away from the central portion.

The drum 20 is provided with a hole 34 for filling, which is closed by a cap 35, and said drum is also provided with an air vent for filling, which is closed by a screw 36. The drum 20 has rows of inwardly projecting pins 38. These rows extend longitudinally and circumferentially. In the present embodiment I have shown seven pins in each longitudinal row, and sixteen pins in each circumferential row (see Fig. 4). I prefer to have the circumferential rows each revolve in one plane, although I do not confine myself to this construction.

The driven member comprises a drum having a cylindrical wall 40 affixed to end plates or walls 41 and 42, preferably by suitable ears 39 screwed to 41 and 42, said cylindrical wall being pierced by small holes 43 to enable the fluid 27 to pass readily through the periphery of the inner or driven drum. Within the driven drum is a pyramidal member or actuator 44, which is slidably keyed to the shaft 30 and is connected to the end wall 42 by a series of pins 46, said end wall being provided with a central boss 45 which surrounds a hub 48, extending longitudinally from the member 44 and connected to the friction cone 29.

In the present embodiment the actuator 44 is shown as octagonal, but I do not confine myself to this form. Each side of the pyramidal member is provided with a groove in which a block 50 is slidably mounted, each block carrying a row of pins or fingers 51. The pins on both the driving and the driven member may be of various cross-sections, as shown by $51^a$, $51^b$, and $51^c$, in Figs. 8, 9, 10, 11 and 12, although I prefer the form shown in Figs. 11 and 12. The pins shown in Fig. 10 move with their flat sides forward with reference to their movement through the liquid. The pins shown in Figs. 11 and 12 are arranged to move through the liquid with their blunt sides forward with respect to the movement of liquid past them, so as to secure considerable resistance to their movement through the liquid while at the same time causing deflection of the liquid laterally with respect to the paths of the pins. This prevents the formation of laminæ of liquid rotating with corresponding sets of pins and secures an effective interaction of the pins upon each other through the medium of the interposed liquid as this liquid to a very considerable degree is moved back and forth between the paths of pins moving in relatively opposite directions. The pins may be cast integrally or they may be formed with shanks $51^d$ to be driven into place.

The blocks 50 are held in the grooves in the actuator 44 by plates 52, and they are held against endwise motion by the end wall 42 and by a flange 54 formed on the inside of the right hand wall of the drum 20. The clutch-member 29 is provided with a peripheral groove 56 which is adapted to receive any desired form of shipper, with which the member 29 and the actuator 44 may be moved longitudinally. When the actuator 44 is moved longitudinally, the blocks 50 with their pins 51 are moved in or out, said pins passing through holes 58 provided in the wall 40, and between the pins 38 which project inwardly from the drum 20. When the outer, or driving, drum is rotated, the fluid 27 passes through the holes 43 into the annular chamber 60 formed between the inner and outer drums, and is thrown outwardly by centrifugal force against the pins 38 and cylindrical wall 20. Thus a rapidly flowing circular river is produced in which the fluid is also under great centrifugal pressure. To bring the inner, or driven, drum into action, the clutch member 29 and actuator 44 are moved toward the right, causing the pins 51 to be pushed through the holes 58 into the chamber 60 between the pins 38. The nearer the clutch-member 29 approaches the clutch-member 28, the farther the pins 51 are projected into the rapidly moving fluid 27, and the greater the extent to which said pins are immersed the greater the amount of power transmitted from the driving drum to the driven drum. When the pins are immersed to their fullest extent, the maximum power is transmitted, and at this time the clutch-members 29 and 28 are brought into engagement, whereupon the driving is effected through said clutch-members.

In the embodiment illustrated in Figs. 3, 4 and 5 the driving member comprises an outer cylindrical shell 70, having an end wall 71 preferably integral therewith, and an end wall 72 affixed thereto by screws. The wall 71 is provided with a boss 73 keyed to a driving shaft 74. An inner cylindrical shell or drum 75 is mounted concentrically with the outer shell and separated therefrom to provide an annular chamber 76, within which a tight annular piston 77 is adapted to move. The piston 77 is connected by three piston rods 78 to a spider 79, slidable on a shaft 80, said spider also carrying an outer clutch-member 82. An inner clutch-member 84 is pinned to the shaft 80, said shaft passing through a stuffing-box 83 and slidably entering the boss 73. The shell 75 is provided with rows of inwardly projecting pins 86 similar to those heretofore described. These may be of the cross-section shown, or they may be of any other suitable cross-section.

The inner, or driven, member comprises a drum 90, which is slidably keyed to the shaft 80, and provided at one end with a plate 92 affixed thereto by screws 93, and provided at its other edge with a flange 94. The outer faces of the plate 92 and flange 94 Figs. 3 and 5 and of the plate 42 and annulus 41 are flat, whereas their inner faces beyond the periphery of the drum are sinusoidal, as shown in Fig. 5. The purpose of this is to secure an axial vibratory shifting of the liquid with respect to the drum as the device rotates so as to prevent the formation of laminæ of liquid rotating with corresponding sets of pins and insure the effective reaction of the two sets of pins upon each other through the interposed liquid medium. This arrangement may be used in lieu of or supplementary to the beveled pins above described for a similar purpose. The amplitude and frequency of the vibratory shifting of the liquid obviously may be varied by varying the height and spacing of the crests of the sinusoidal faces mentioned, and in cases where the driven shaft is to be rotated at nearly the same speed as the driving shaft I regard it as desirable to space the crests more closely than in cases where a relatively large slippage is to occur. Rows of pins or fingers 96 extend outwardly from the periphery of the drum 90, these rows extending longitudinally and circumferentially, as explained heretofore.

The outer, or driving, drum has rows of inwardly projecting pins, and the inner, or driven, drum has outwardly projecting pins, and these pins pass each other in the spaces left in each row for that purpose. The pins in a circumferential row preferably rotate in one plane. The result of this condition is that there would naturally tend to be rings of faster moving fluid in the planes of the pins of the outer drum, and rings of slower moving fluid in the planes of the pins of the inner drum. This may be remedied in two ways, viz. by a longitudinal movement of the drums in combination with their circular movement, which would bring the slow-moving pins into the fast-moving fluid, and vice versa. This entails some complication and some expense of power, so I prefer the way I have shown, viz. to move the fluid itself longitudinally by making the walls of the driven drum sinuous to an amount at least equal to the distance between the center of a driving pin and that of the nearest driven pin. This sinuosity causes the fluid to be moved as a mass longitudinally back and forth, in the direction of the axis of the drum or laterally with reference to the plane of rotation, bringing the fast-moving fluid against the driven pins to accelerate them, and then when the fluid is retarded sending it back against the fast-moving pins to be speeded up again. The second way employed conjointly with the foregoing is to shape the striking and struck surfaces of the pins so as to cause the fluid to be more or less reflected from one system to the other. I prefer the form shown in Figs. 11 and 12, although I have used some of the other forms shown.

The chamber 76 is adapted to hold the transmitting medium or fluid, which is allowed to pass into or out of the space 97 between the drum 90 and the shell 75 through one or more holes 98 provided in the shell 75. When the device is started up, the piston 77 is at the right hand end of the chamber 76, and the transmitting fluid is contained in the lower half of said chamber, and some is in the lower half of the chamber 97. When the device is speeded up, the fluid will enter the chamber 76 under the action of centrifugal force. Now, to produce a driving connection between the driving member and the member to be driven, the clutch member 82 is moved toward the left, and with it the piston 77 is moved toward the left, thus forcing the fluid in the chamber 76 through the holes 98 into the chamber 97. Here it is rotated at high speed and with great centrifugal pressure, by the pins 86 on the shell 75, and encounters the pins 96 on the drum 90.

In order to vary the power, or the speed under constant load without varying the speed of the driving member, it is merely necessary to vary the area upon which the fluid acts. Thus as the piston 77 is moved toward the left, a greater amount of fluid is forced into the space 97, and consequently a greater area of the pins 96 is immersed in the fluid. When the piston is moved over to the extreme left the entire amount of fluid is in the chamber 97 and the maximum power is transmitted. At this time the clutch-members 82 and 84 are brought into engagement and the power is then transmitted through them.

Instead of employing a tight piston in the chamber 76, I may provide an elastic bag or tube 100, (see Fig. 6) of rubber or other suitable material adapted to contain the fluid 101 and communicating with the chamber 97 through a passage 102. A piston 104, operated in the manner explained above, is adapted to compress the bag 100 to force the fluid into the chamber 97, or, when moved in the opposite direction, to allow the fluid to escape from said chamber into said bag. Or, I may employ an annular, metallic accordion-like device 110, shown in Fig. 7, which can be substituted for the rubber bag 100, and can be compressed by the piston 104.

Various other alternative arrangements will suggest themselves, the essential purpose being to secure a movable abutment which will act upon the fluid to displace the same and which in any manner is protected against leakage of fluid past the same.

Where mercury is used in connection with a rubber bag, the rubber must be free from sulfur, and the mercury is preferably protected and lubricated with some fluid which will not attack rubber, as for example glycerin. With the metallic expander, preferably of steel, mercury and any oil could be used.

From the foregoing it is obvious that either form of device described involves two relatively movable sets of pins, the pins of each set passing through spaces between the pins of the other set, and the two sets reacting upon each other through an interposed liquid medium, which either by an adjustment of the pins themselves or of the amount of liquid in operative relation with the pins, is varied in the degree of its effective interaction with the two sets of pins. Fundamentally the adjustment is identical in the two cases, because it is in both cases an adjustment of the effective interaction of the pins and the interposed liquid. In addition to the above feature is the idea of deflection of the liquid laterally so as alternately to come into the paths of the two sets of pins, this action being produced by a beveled form of pin or by sinuous guide flanges, or both. Obviously in any given adjustment of the device the speed of the driven element will accommodate itself to the load imposed on that element.

Although the transmitting fluid is shown in the central portion of the device in the drawings, it will be understood that this is its position just as the device is starting. When once in motion the fluid will move outward under the action of centrifugal force.

What I claim is:—

1. A power transmitter comprising a fluid-tight chamber; a body of fluid within said chamber; a driving means acting upon said fluid body to rotate it; a driven means absorbing energy from the rotating fluid; and means for bodily shifting the driving fluid laterally to the plane of rotation, while the device is in operation.

2. A power transmitter comprising a closed drum or shell; a body of fluid within said shell; a driving means acting upon said fluid to rotate the same; a driven means having fingers extending into the moving fluid and thereby absorbing energy from the rotation of said fluid; and means for bodily reciprocating said driving fluid in the direction of the axis of rotation, during operation of the device.

3. A power transmitter comprising, in combination, a sealed containing shell or drum; a fluid contained within said drum; a driving member acting upon said fluid to rotate the same; a driven member absorbing energy from the rotation of said fluid; and means for producing relative lateral movement between said fluid and said members, during rotation of the parts.

4. A power transmitter comprising a closed containing drum or shell; a fluid contained therein; a driving member acting upon the fluid to rotate the same; a driven member absorbing energy from the rotation of said fluid; and means for producing relative reciprocatory lateral movement between said fluid and said rotating members during the rotation of said members.

5. A power transmitter comprising a closed shell or drum; a fluid medium contained therein; a driving member provided with radial pins or projections extending into and serving to give rotary motion to the fluid medium; a driven member provided with radial projections arranged to pass between those of the driving member, the radial pins or projections of the driving and driven members co-acting to create in the fluid medium zones having different rates of forward or rotary motion; and means for laterally shifting the fluid medium and thereby causing the fluid of the fast-moving zones to displace the slower-moving zones, and vice versa.

6. A power transmission mechanism, comprising a rotary driving member, a transmitting medium rotated by said member and subjected to the action of centrifugal force, a driven member, means for varying the amount of engagement of said driven member with said medium to regulate the amount of power transmitted, and means for causing said medium to shift longitudinally during its rotation.

7. A power transmission mechanism, comprising a rotary driving member provided with inwardly projecting pins, a transmitting medium adapted to be engaged and rotated by said pins, a driven member having outwardly projecting pins adapted to be engaged by said medium to rotate said driven member, and means for causing said medium to shift longitudinally during its rotation.

8. A power transmission mechanism, comprising a rotary driving member provided with inwardly projecting pins, a transmitting medium adapted to be engaged and rotated by said pins, a driven member having outwardly projecting pins adapted to be engaged by said medium to rotate said driven member, and means for varying the amount of said medium which is rotated in engagement with said pins.

9. A power transmission mechanism, comprising a rotary driving member provided with inwardly projecting pins, a transmitting medium adapted to be engaged and rotated by said pins, a driven member having outwardly projecting pins adapted to be engaged by said medium to rotate said driven member, means for varying the extent to which the pins of the driven member engage said medium, and means for causing said medium to reciprocate longitudinally during its rotation.

10. A power transmission mechanism, comprising a rotary driving member provided with inwardly projecting pins, a transmitting medium adapted to be engaged and rotated by said pins, a rotary driven member having outwardly projecting pins adapted to be engaged by said medium to rotate said driven member, means for varying the extent to which the pins of the driven member engage the medium, means for causing said medium to reciprocate longitudinally during its rotation, and means for locking said driving and driven members together when the pins of said driven member are engaged to the fullest extent by said medium.

11. A power transmission mechanism, comprising a rotary driving member having a plurality of rows of spaced pins extending longitudinally and circumferentially thereof, a fluid arranged to be rotated by said pins and subjected to centrifugal action, a driven member having a plurality of rows of spaced pins extending longitudinally and circumferentially thereof, and means for causing said fluid to move back and forth longitudinally while being rotated.

12. A power transmission mechanism comprising in combination a receptacle having two communicating chambers; a liquid contained in one chamber; a rotary driving member provided with impelling blades turning in said second chamber; a rotary driven member provided with impelling blades rotating in said second chamber coaxially with the first named impelling blades; and means for positively forcing said liquid from the first named chamber in controllable quantities into the second named chamber to vary the effective engagement of said impelling blades with said liquid.

13. A power transmission mechanism, comprising a driving member having provision for producing a rapidly revolving stream of fluid with great centrifugal pressure, a driven member having means adapted to be immersed in said fluid to a varying degree to vary the amount of power transmitted, and means for causing said fluid to shift longitudinally during its rotation.

In testimony whereof I have affixed my signature, in presence of two witnesses.

MELVIN L. SEVERY.

Witnesses:
EDWARD S. CROCKETT,
ESTHER R. PRUSSIAN.